United States Patent [19]

Vanderpol et al.

[11] Patent Number: 4,802,278
[45] Date of Patent: Feb. 7, 1989

[54] GEAR DRIVEN TUBE CUTTER

[75] Inventors: Jerald Vanderpol, Eldorado Hills; Neil Pfafman, Placerville; Cory J. Silber, Sacramento, all of Calif.

[73] Assignee: Tri Tool, Inc., Rancho Cordova, Calif.

[21] Appl. No.: 82,135

[22] Filed: Aug. 6, 1987

[51] Int. Cl.⁴ .................................. B23D 21/06
[52] U.S. Cl. ...................................... 30/97; 30/101; 74/435; 74/425; 74/417; 81/57.19; 82/72
[58] Field of Search ............... 30/95, 96, 97, 99, 101, 30/102; 81/57.19, 57.20; 82/70.20, 4 C, 72; 74/425, 417, 421 A, 420, 435

[56] References Cited

U.S. PATENT DOCUMENTS

| | | | |
|---|---|---|---|
| 882,432 | 3/1908 | Thomas | 30/99 |
| 1,092,304 | 4/1914 | Strickler | 30/99 |
| 1,871,857 | 8/1932 | Martois | 81/57.16 |
| 1,913,669 | 6/1933 | Heald | 81/62 |
| 2,281,300 | 4/1942 | Waldo | 192/43.1 |
| 2,379,177 | 6/1945 | Pavey | 30/99 |
| 2,447,371 | 8/1948 | Sipsma et al. | 30/99 |
| 2,758,569 | 8/1956 | Peterson | 121/3 |
| 2,769,235 | 11/1956 | Martois | 30/97 |
| 3,005,355 | 10/1961 | Mason | 74/112 |
| 3,191,465 | 6/1965 | Parker | 81/52.35 |
| 3,370,352 | 2/1968 | Steely | 30/97 |
| 3,715,804 | 2/1973 | Kelley | 30/102 |
| 3,732,618 | 5/1973 | Lorenz | 30/97 |
| 3,795,051 | 3/1974 | Feamster, III | 30/101 |
| 3,807,047 | 4/1974 | Sherer et al. | 30/97 |
| 3,839,791 | 10/1974 | Feamster, III | 30/97 |
| 3,942,248 | 3/1976 | Sherer et al. | 30/97 |
| 4,185,525 | 1/1980 | Sherer | 82/4 C |
| 4,271,733 | 6/1981 | Stone | 82/4 C |
| 4,305,205 | 12/1981 | Girala | 30/102 |
| 4,347,664 | 9/1982 | Petrillo | 30/97 |
| 4,372,181 | 2/1983 | Tinsley | 81/57.39 |
| 4,416,062 | 11/1983 | Cummings | 30/101 |
| 4,438,562 | 3/1984 | Courty | 30/99 |
| 4,480,510 | 11/1984 | Aparicio, Jr. et al. | 81/57.39 |
| 4,493,150 | 1/1985 | Garcia et al. | 30/97 |
| 4,574,664 | 3/1986 | Curry | 81/57.19 X |

FOREIGN PATENT DOCUMENTS

| | | | |
|---|---|---|---|
| 2528340 | 12/1983 | France | 30/101 |
| 815373 | 4/1981 | U.S.S.R. | |

Primary Examiner—Eugene R. LaRoche
Assistant Examiner—Seung Ham
Attorney, Agent, or Firm—Bacon & Thomas

[57] ABSTRACT

A tube cutting tool is described in which a cutting head is rotatably mounted within a cutting body wherein both define "C" shaped slots to enable the cutting tool to be inserted laterally over a tube. A cutting wheel is attached to the cutting head such that rotation of the cutting head causes the wheel to pass around the periphery of the tube. A feed device is incorporated which biases the cutting wheel into contact with the tube until the tubing wall has been completely severed. A gear drive mechanism interconnects a power source with the cutting head to rotate it about the tube. A clamping system is also disclosed to clamp the device onto the tube during the cutting process.

25 Claims, 4 Drawing Sheets

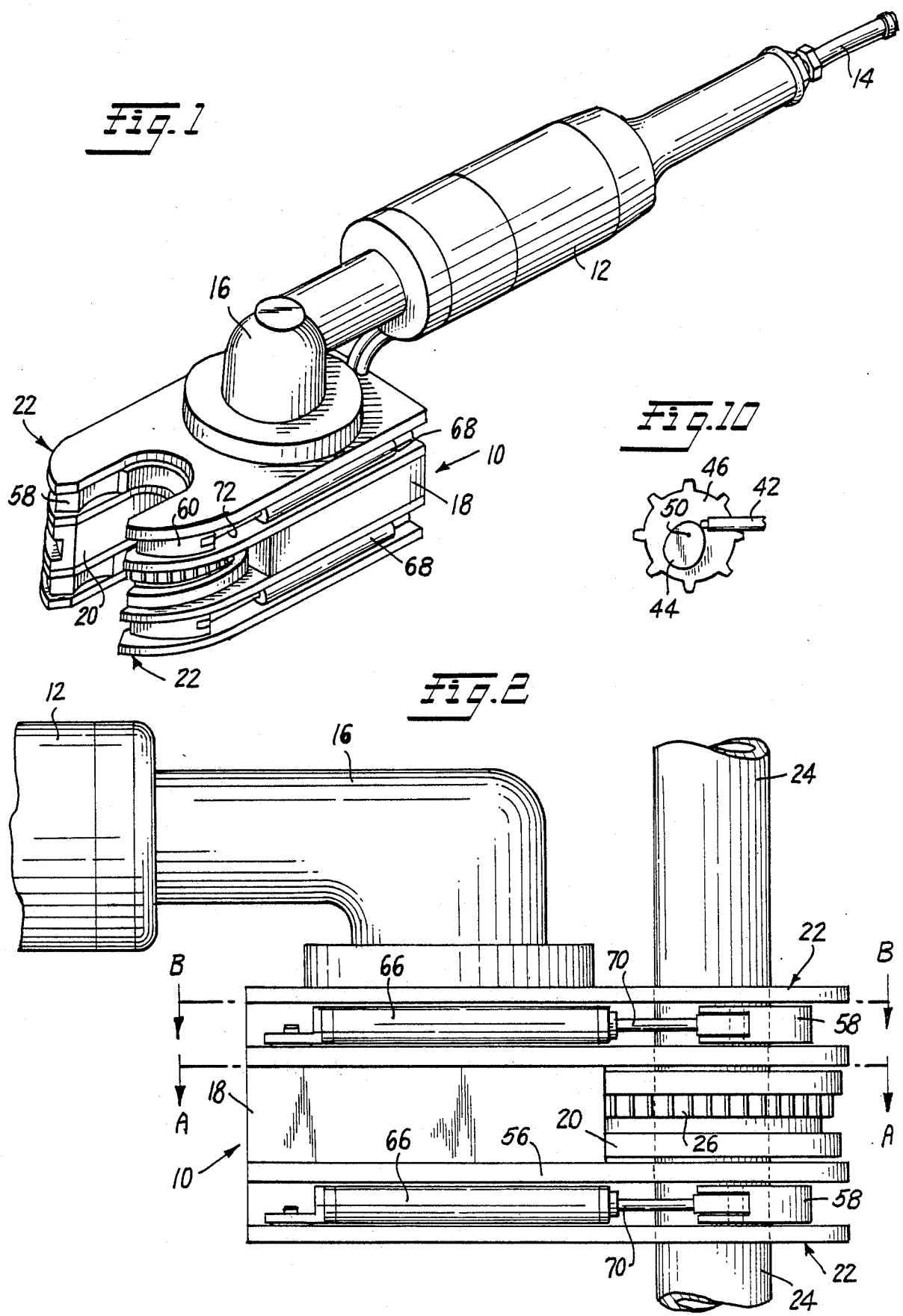

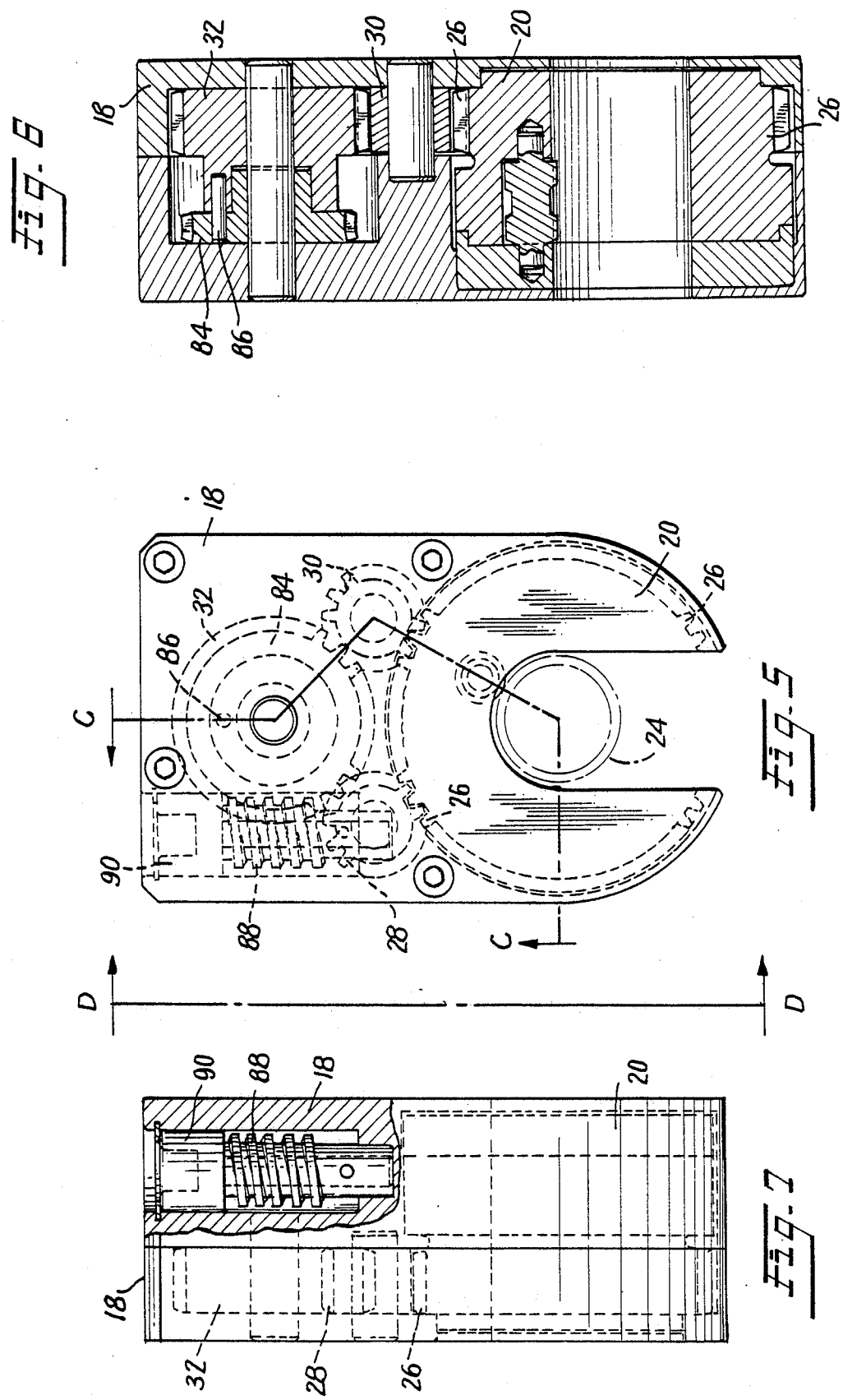

GEAR DRIVEN TUBE CUTTER

BACKGROUND OF THE INVENTION

Tube cutting tools are well known in the art and typically comprise a cutting wheel rotatably mounted on a pivotable arm or a movable jaw of the tool such that it may be biased into contact with the outer surface of the tube. Means are provided to draw the cutting wheel around the outer periphery of the tube, causing the cutter wheel to score the surface. As a complete revolution about the tube is completed, the cutting wheel is further biased against the tube's surface until the tube wall is cut completely through.

In its most rudimentary form, such cutting tools have a cutting head to which the cutting wheel arm or jaw is attached and some form of handle such that the entire cutting head may be rotated about the tube. In order to minimize the sliding friction between the cutter head and the tube, one or more support rollers may be incorporated into the cutter head to act as roller bearings as the head is drawn around the tube.

In those instances where the tube is readily accessible, the known tube cutters have proven satisfactory. However, it is often necessary to cut a tube which has limited accessibility. In modern aircraft, machinery and other structures where space is at a premium, it is often necessary to run tubing through very limited access areas. This presents a significant problem when it becomes necessary to remove or replace parts and the tubing must first be severed. Quite obviously, such situations prevent the use of the aforementioned tube cutting tools in which the entire tool must be rotated about the tube.

Tube cutting tools have been proposed which utilize a ratchet mechanism interposed between a cutter head and an actuating handle such that the handle itself need not be passed completely around the tube. The cutting head is rotated by oscillating the handle back and forth until the cutter head passes around the tube a sufficient number of times to sever the tube wall. While these devices have somewhat alleviated the problem of cutting tubes having limited accessibility, their jaw or arm feeding mechanisms have rendered them more bulky than necessary and, consequently, have limited their applicability to tubes having extremely tight clearances. Furthermore, these devices are limited strictly to manual operation and are incompatible with any power drive mechanism.

It is also known to provide such cutting tools having rotatable cutting heads with a power drive mechanism. Such mechanisms typically utilize a gear formed on the exterior surface of the rotatable cutting head which meshes with a pair of worm drive gears. The worm drive gears may, in turn, be driven by bevel gears in operative contact with a power source. While such tube cutters have alleviated the problems associated with the manually operated cutting tools, the use of worm drive gears has unnecessarily enlarged the size of the cutting tool such that it may not be utilized to cut tubing having extremely tight clearances. The pair of worm gears typically extend outwardly on either side of the cutting head, thereby increasing the overall lateral dimensions of the cutting tool. It is also known to provide the power cutting heads with an automatic feed mechanism which biases the cutting wheel into engagement with the surface of the tube as the cutting head rotates.

SUMMARY OF THE INVENTION

It is an object of this invention to provide a powered tube cutting tool which overcomes the aforementioned difficulties of the known cutting tools and one which enables the cutting of a tube having an extremely limited access. The tool has a rotatable cutting head with a cutting wheel mounted thereon so as to engage the outer surface of the tube. Rollers are provided on the cutting head to minimize friction between the cutting head and the tube as the head is rotated.

The tool has a gear drive system to rotate the cutting head which does not increase the lateral dimensions of the tool beyond that of the cutting head. A main drive gear drives a pair of spur gears which, in turn, operatively engage a gear formed on, or attached to, the periphery of the cutting head. The main drive gear may be directly connected to a power source, such as a pneumatic or hydraulic motor. Alternatively, the main drive gear may be driven via a bevel gear or a worm gear to further minimize the overall height dimension of the cutting tool. The use of the bevel gear or the worm gear enables the attachment of the power source to the rear portion of the tool so as to minimize the overall dimensions of the device.

Feed means are also provided in the device to automatically feed the cutting wheel toward the surface of the cutting tube as the cutting head rotates. A clamping system may also be incorporated in the cutting tool to enable it to be positively clamped around the tubing during the cutting operation.

BRIEF DESCRIPTION OF THE DRAWINGS

FIG. 1 is a perspective view showing the cutting tool according to the invention attached to a pneumatic power source.

FIG. 2 is a side view of the cutting device shown in FIG. 1.

FIG. 5 is a top view of the cutting tool according to the invention incorporating a second embodiment of the gear drive system.

FIG. 6 is a cross sectional view taken along line C—C in FIG. 5.

FIG. 7 is a side view, partially broken away, viewed in the direction of arrows D—D in FIG. 5.

FIG. 10 is a partial view along line F—F in FIG. 3.

DETAILED DESCRIPTION OF THE PREFERRED EMBODIMENTS

Figure 3:
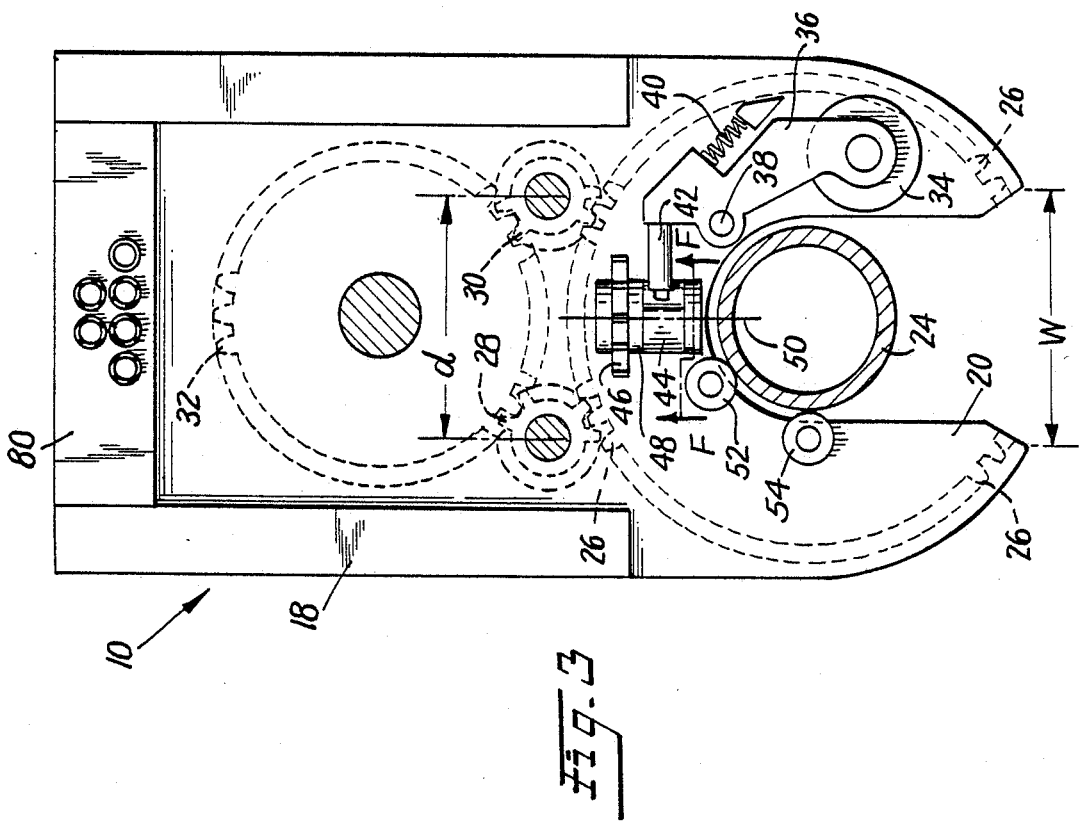
FIG. 3 is a top view of the cutting device according to the invention taken along line A—A in FIG. 2.

The cutting tool 10 according to the invention is shown in FIG. 1 as being attached to a pneumatic motor 12 which, in turn, is connected with a source of compressed air (not shown) via hose 14. A 90° drive system interconnects the output shaft of the motor 12 with the main drive gear of the cutting tool, as will be described in more detail hereinafter. It should be understood that the drive motor 12 and the 90° drive system 16, per se, from no part of the instant invention and any power source, such as an electric motor or a hydraulic motor may be utilized with the cutting tool according to the invention.

The cutting tool 10 generally comprises a cutting body 18 having a cutting head 20 rotatably mounted thereon. As seen in FIG. 1, the cutting tool 10 also has a pair of clamping devices 22 attached on either side thereof such that the cutting tool may be clamped onto a tube during the cutting process. The use of such clamping devices are optional and the cutting tool 10 is completely functional without the use of such clamping devices 22.

The clamping devices 22, the cutting body 18 and the cutting head 20 all define generally "C" shaped slots to enable the cutting tool to be laterally placed over tubing 24 as shown in FIG. 2. A top view of the cutting tool 10 is shown in FIG. 3 as viewed in the direction of line A—A in FIG. 2. As can be seen, the cutting head 20 is rotatably attached to cutting body 18 such that it may rotate about an axis which is substantially coincident with the axis of the tube 24 when the device is placed over the tube. Cutting head 20 has gear teeth 26 formed about its outer periphery which engage a pair of laterally spaced apart spur gears 28 and 30. Spur gears 28 and 30 are also rotatably mounted in cutting body 18 such that their axes of rotation extend substantially parallel to the axis of rotation of cutting head 20. Main drive gear 32 is rotatably mounted in cutting body 18 such that it operatively engages both spur gears 28 and 30. Main drive gear 32 is connected to an output of the 90° drive system 16 such that it is driven by the operation of motor 12. Thus, as can be seen from FIG. 3, rotation of main drive gear 32 causes spur gears 28 and 30 to rotate which, in turn, drives cutting head 20 about its axis of rotation.

The lateral distance d between the axes of rotation of spur gears 28 and 30 is greater than the width w of the slot defined by the cutting head 20 such that one of the spur gears 28 or 30 is engaged with teeth 26 at all times during the rotation of the cutting head 20.

Cutting wheel 34 is rotatably attached to one end of arm 26 which, in turn, is pivotally supported on cutting head 20 so as to pivot about axis 38. Spring 40 is interposed between arm 36 and cutting head 20 so as to exert a bias on the cutting arm tending to urge it in a counterclockwise direction of rotation about axis 38 as viewed in FIG. 3, which tends to bias the cutting wheel 34 out of contact and away from the surface of tube 24. Cutting wheel 34 is urged into contact with the surface of tube 24 by the action of cam follower 42, attached to arm 36, and rotatable cam 44. Cam 44 is connected to a star wheel 46 with clutch 48 interposed therebetween such that rotation of the star wheel about axis 50 causes cam 44 to also rotate about this axis thereby exerting a force on arm 36 through cam follower 42 overcoming the biasing force of spring 40 and urging the cutting wheel 34 into contact with tube 24. Star wheel 46 may be rotated by contact between the star wheel and a fixed pin in known fashion. The pin may be in a fixed location and as the star wheel revolves with cutting head 20 contact between the star wheel and the stationary pin will cause the star wheel to incrementally rotate about axis 50. Thus, for each rotation of cutting end 20 the cutting wheel 34 is urged further into the tube 24 until the tube wall is completely severed. It is to be understood that other automatic feed devices may be utilized in conjunction with the cutting tool without exceeding the scope of this invention.

Rollers 52 and 54 are rotatably affixed to cutting head 20 such that a portion of their peripheries extend into the slot defined in the cutting head 20 to locate and bear against the outer surface of tubing 24. Rollers 52 and 54 serve as a locating means and a roller bearing support for the cutting head 20 to minimize the friction between it and tube 24 as cutting head 20 rotates about the tube.

Figure 4:
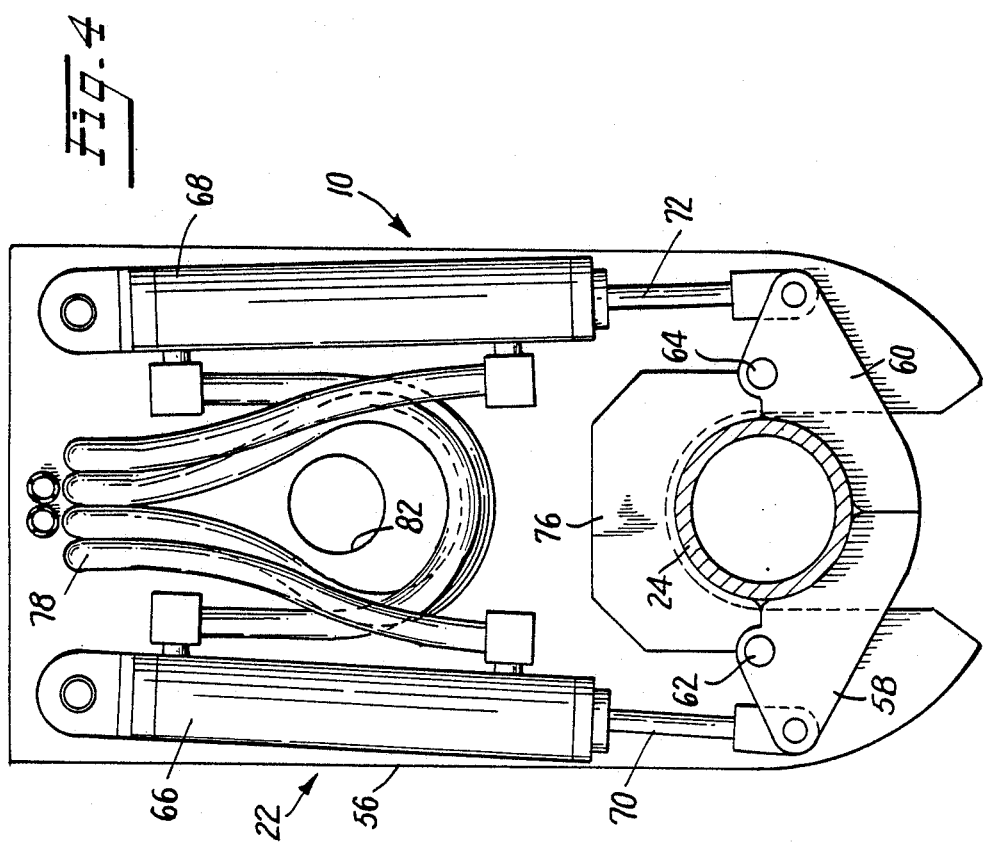
FIG. 4 is a top view of the clamping device taken along line B—B in FIG. 2 showing the clamping jaws in closed positions.

In some instances it may be necessary to clamp the cutting device onto the tube during the cutting operation. In this case, clamping devices 22 may be utilized in conjunction with the cutting device 10. As shown in FIG. 4, each of the cutting devices 22 comprises a mounting plate 56 which is attached to the cutting device 10 and has clamping jaws 58 and 60 attached thereto so as to pivot about axes 62 and 64, respectively. Pneumatic cylinders 66 and 68 are attached to mounting plate 56 such that their piston rods 70 and 72 are connected to clamping jaws 58 and 60, respectively. Thus, as can be seen, extension and retraction of piston rods 70 and 72 will cause clamping jaws 58 and 60 to pivot about respective axes 62 and 64 between closed and opened positions. Each of the clamping jaws 58 and 60 may define a substantially one-quarter circle, arcuate surface to engage the outer surface of the tube 24. Support block 76, which may define a semicircular surface, is attached to mounting plate 56 so as to bear against the outer surface of the tube 24.

Pneumatic cylinders 66 and 68 are connected to the pneumatic power source via hoses 78 and air manifold 80 located in cutting body 18. Mounting plate 56 may define opening 82 to facilitate the connection of 90° drive system 16 with main drive gear 32.

A second embodiment of the invention is shown in FIGS. 5–7 and may be used where it is desired to further reduce the overall height of the cutting device and its attachment to a power source. The embodiment shown in these Figures eliminates the need for 90° drive system 16 and enables the motor 12 to be connected directly to the rear portion of the cutting body 18. In this embodiment, the orientation and function of main drive gear 32, spur gears 28 and 30 and cutting head 20 is exactly the same as in the embodiment previously described. However, a worm wheel 84 is formed as part of, or attached to, main drive gear 32 as shown in FIG. 6. If the worm wheel 84 is formed separately from main drive gear 32, pin 86 may be inserted through these elements to insure that there is no relative rotation between them. Worm gear 88 is rotatably mounted in cutting body 18 such that it operatively engages worm wheel 84 as shown in FIGS. 5 and 7. Worm gear 88 is mounted on shaft 90 which opens to the rear of cutting body 18 with means thereon to connect it to a shaft of power source 12.

Figure 9:
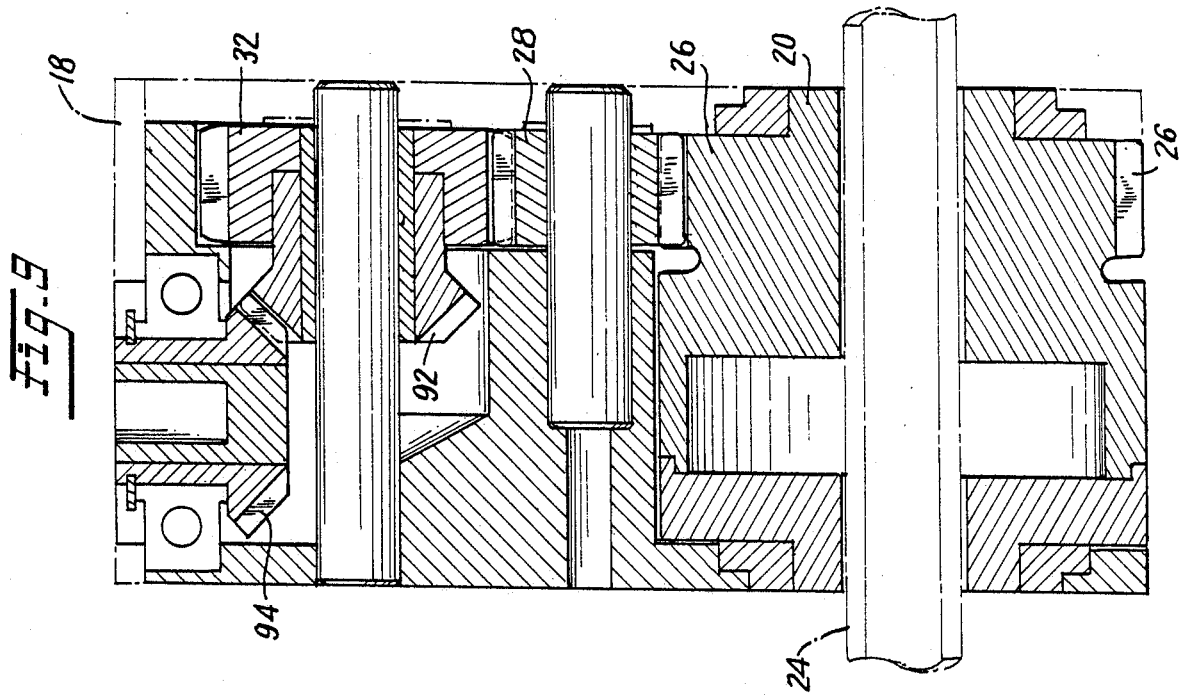
FIG. 9 is a cross sectional view taken along line E—E in FIG. 8.
Figure 8:
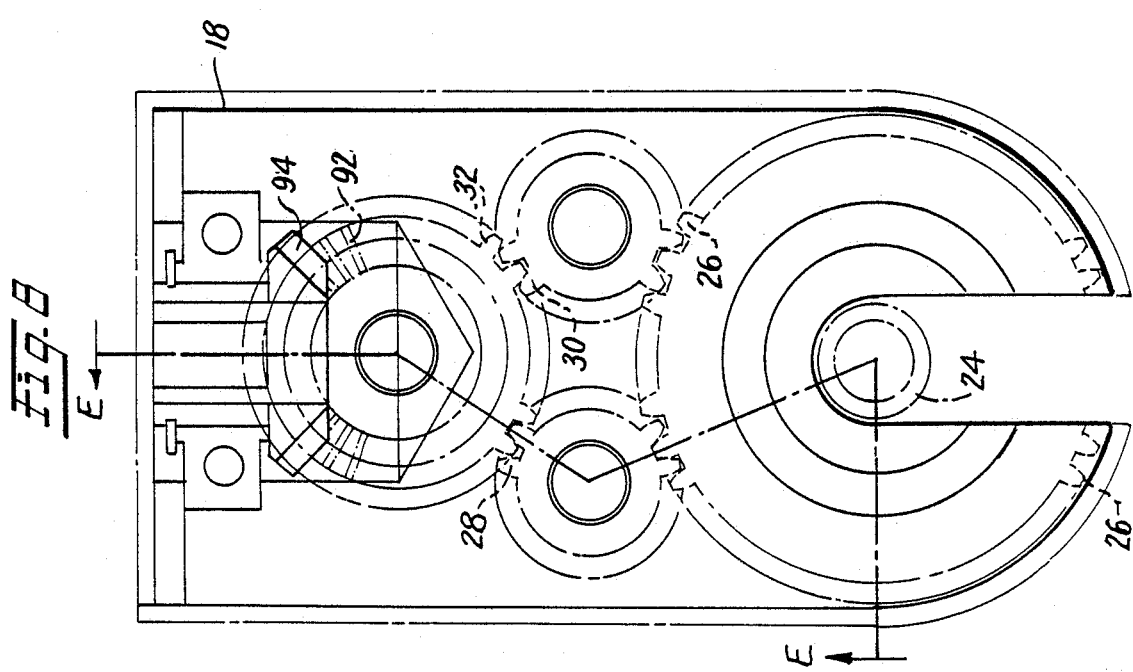
FIG. 8 is a top view of the cutting tool according to the invention showing a third embodiment of the gear drive system.

In the embodiment of the invention shown in FIGS. 8 and 9, worm gear 88 and worm wheel 86 have been replaced by bevel gears 92 and 94. Bevel gear 92 is fixedly attached to main drive gear 32 so as to rotate therewith. Bevel gear 94 is rotatably attached to cutting body 18 such that it operatively engages bevel gear 92. Bevel gear 94 opens to the rear of cutting body 18 and has means thereon to connect it to power source 12.

It is also possible to form the gear teeth 26 on cutting head 20 in the form of a worm wheel having an outer diameter smaller than the outer diameter of the cutting head. The cutting head 20 may then be driven by a pair of worm gears located on either side of the worm wheel attached to the cutting head such that the outermost lateral dimensions of the worm gears is less than the diameter of cutting head 20. The worm gears may be driven by spur gears 28 and 30. The orientation of these spur gears, as well as main drive gear 32 is changed from the embodiments previously described such that their axes of rotation extend substantially perpendicular to the axis of rotation of cutting head 20. Main drive gear 30 is mounted between the spur gears 28 an 30 and may be connected to a power source through the rear of the cutting body 18.

The foregoing description is provided for illustrative purposes only and should not be construed in any way limiting the invention. The scope of which is defined solely by the appended claims.

What is claimed is:

1. A gear driven cutting tool for cutting through a wall of tube comprising:
   (a) a cutting body defining a first slot opening outwardly through a first end to accommodate a tube therein;
   (b) a cutting head rotatably mounted within the cutting body so as to rotate about a first axis, the cutting head defining a second slot;
   (c) a generally "C" shaped driven gear attached to the cutting head such that an opening defined by the generally "C" shape coincides with the second slot, the opening having a width w measured at the mouth of the "C";
   (d) at least first and second spur gears rotatably mounted in the cutting body so as to rotate about second and third axes, the spur gears operatively engaging the generally "C" shaped gear, the second and third axes being spaced apart by a distance d such that $d > w$;
   (e) cutting means mounted on the cutting head and adapted to extend into the second slot so as to bear against a tube therein;
   (f) feed means operatively associated with the cutting means to urge the cutting means against the tube; and
   (g) gear drive means operatively engaging the first and second spur gears so as to cause rotation of the cutting head about the first axis to draw the cutting means about the periphery of the tube to thereby sever the tubing wall.

2. The gear driven cutting tool according to claim 1 wherein the gear drive means comprises:
   (a) a main drive gear operatively engaging the first and second spur gears; and,
   (b) means to connect the main drive gear to a power source.

3. The gear driven cutting tool according to claim 2 wherein the means to connect the main drive gear to a power source comprises:
   (a) a worm wheel attached to the main drive gear;
   (b) a worm gear rotatably mounted in the cutting body and drivingly engaging the worm wheel; and,
   (c) means to connect the worm gear to a power source.

4. The gear driven cutting tool according to claim 2 wherein the means to connect the main drive gear to a power source comprises:
   (a) a first bevel gear attached to the main drive gear;
   (b) a second bevel gear rotatably mounted in the cutting body and operatively engaging the first bevel gear; and
   (c) means to connect the second bevel gear to a power source.

5. The gear driven cutting tool according to claim 1 wherein the cutting means comprises:
   (a) an arm pivotally mounted on the cutting head; and,
   (b) a cutting wheel rotatably attached to one end of the arm.

6. The gear driven cutting tool according to claim 5 wherein the feed means comprises means for automatically feeding the cutting wheel toward the tube as the cutting head rotates.

7. The gear driven cutting tool according to claim 6 wherein the automatic feed means comprises:
   (a) a cam rotatably attached to the cutting head;
   (b) a cam follower attached to the arm and bearing against the cam; and,
   (c) means to rotate the cam as the cutting head rotates.

8. The gear driven cutting tool according to claim 7 wherein the means to rotate the cam comprises:
   (a) a star wheel attached to the cam so as to rotate therewith; and,
   (b) stationary means contacting the star wheel during a portion of the rotation of the cutting head to thereby cause rotation of the star wheel and cam.

9. The gear driven cutting tool according to claim 8 wherein the gear drive means comprises:
   (a) a main drive gear operatively engaging the first and second spur gears; and,
   (b) means to connect the main drive gear to a power source.

10. The gear driven cutting tool according to claim 9 wherein the means to connect the main drive gear to a power source comprises:
    (a) a worm wheel attached to the main drive gear;
    (b) a worm gear rotatably mounted in the cutting body and drivingly engaging the worm wheel; and,
    (c) means to connect the worm gear to a power source.

11. The gear driven cutting tool according to claim 9 wherein the means to connect the main drive gear to a power source comprises:
    (a) a first bevel gear attached to the main drive gear;
    (b) a second bevel gear rotatably mounted in the cutting body and operatively engaging the first bevel gear; and,
    (c) means to connect the second bevel gear to a power source.

12. The gear driven cutting tool according to claim 11 wherein the means to connect the main drive gear to a power source comprises:
    (a) a first bevel gear attached to the main drive gear;
    (b) a second bevel gear rotatably mounted in the cutting body and operatively engaging the first bevel gear; and,
    (c) means to connect the second bevel gear to a power source.

13. The gear driven cutting tool according to claim 1 further comprising clamping means to clamp the cutting tool to the tube.

14. The gear driven cutting tool according to claim 13 wherein the clamping means comprises:
    (a) jaw means pivotally attached to the cutting body; and,
    (b) means to move the jaw means between open and closed positions.

15. The gear driven cutting tool according to claim 14 wherein the jaw means comprises a pair of jaw members.

16. The gear driven cutting tool according to claim 15 wherein the means to move the jaw means comprises:
  (a) actuating cylinder means having extendable and retractable piston rod attached to the jaw members; and,
  (b) means to connect the actuating cylinder means to a pressure fluid source.

17. The gear driven cutting tool according to claim 16 wherein the gear drive means comprises:
  (a) a main drive gear operatively engaging the first and second spur gears; and,
  (b) means to connect the main drive gear to a power source.

18. The gear driven cutting tool according to claim 17 wherein the means to connect the main drive gear to a power source comprises:
  (a) a worm wheel attached to the main drive gear;
  (b) a worm gear rotatably mounted in the cutting body and drivingly engaging the worm wheel; and,
  (c) means to connect the worm gear to a power source.

19. The gear driven cutting tool according to claim 17 wherein the means to connect the main drive gear to a power source comprises:
  (a) a first bevel gear attached to the main drive gear;
  (b) a second bevel gear rotatably mounted in the cutting body and operatively engaging the first bevel gear; and,
  (c) means to connect the second bevel gear to a power source.

20. The gear driven cutting tool according to claim 16 wherein the cutting means comprises:
  (a) an arm pivotally mounted on the cutting head; and,
  (b) a cutting wheel rotatably attached to one end of the arm.

21. The gear driven cutting tool according to claim 20 wherein the feed means comprises means for automatically feeding the cutting wheel toward the tube as the cutting head rotates.

22. The gear driven cutting tool according to claim 21 wherein the automatic feed means comprises:
  (a) a cam rotatably attached to the cutting head;
  (b) a cam follower attached to the arm and bearing against the cam; and,
  (c) means to rotate the cam as the cutting head rotates.

23. The gear driven cutting tool according to claim 22 wherein the means to rotate the cam comprises:
  (a) a star wheel attached to the cam so as to rotate therewith; and,
  (b) stationary means contacting the star wheel causing a portion of the rotation of the cutting head to thereby cause rotation of the star wheel and cam.

24. The gear driven cutting tool attached to claim 23 wherein the gear drive means comprises:
  (a) a main drive gear operatively engaging the first and second spur gears; and,
  (b) means to connect the main drive gear to a power source.

25. The gear driven cutting tool according to claim 24 wherein the means to connect the main drive gear to a power source comprises:
  (a) a worm wheel attached to the main drive gear;
  (b) a worm gear rotatably mounted in the cutting body and drivingly engaging the worm wheel; and,
  (c) means to connect the worm gear to a power source.

* * * * *